US009621511B2

(12) United States Patent
Premji et al.

(10) Patent No.: US 9,621,511 B2
(45) Date of Patent: Apr. 11, 2017

(54) METHOD AND SYSTEM FOR AUTO-PROVISIONING NETWORK DEVICES IN A DATA CENTER USING NETWORK DEVICE LOCATION IN NETWORK TOPOLOGY

(71) Applicants: Ariff Premji, Redmond, WA (US); Andre Henri Joseph Pech, San Francisco, CA (US); Douglas Alan Gourlay, San Francisco, CA (US)

(72) Inventors: Ariff Premji, Redmond, WA (US); Andre Henri Joseph Pech, San Francisco, CA (US); Douglas Alan Gourlay, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 563 days.

(21) Appl. No.: 14/022,784

(22) Filed: Sep. 10, 2013

(65) Prior Publication Data

US 2015/0074246 A1 Mar. 12, 2015

(51) Int. Cl.
*G06F 15/177* (2006.01)
*H04L 29/12* (2006.01)
(Continued)

(52) U.S. Cl.
CPC ...... *H04L 61/2015* (2013.01); *H04L 41/0886* (2013.01); *H04L 41/12* (2013.01);
(Continued)

(58) Field of Classification Search
CPC ... H04L 61/2015; H04L 49/356; H04L 49/65; H04L 41/0886; H04L 41/0806; H04L 41/12
(Continued)

(56) References Cited

U.S. PATENT DOCUMENTS

2004/0073663 A1\* 4/2004 Scarth ................. H04L 41/22
709/224
2010/0290473 A1\* 11/2010 Enduri .................. H04L 49/70
370/395.53

(Continued)

*Primary Examiner* — Anthony Mejia
*Assistant Examiner* — Herman Belcher
(74) *Attorney, Agent, or Firm* — Osha Liang LLP

(57) ABSTRACT

A non-transitory computer readable medium includes instructions, which, when executed by a processor, perform a method on a network device. The method includes receiving, from a configuration server, a master configuration script that includes an instruction set, a network topology for network devices, and a dictionary. The dictionary includes network device specific configuration scripts for the network devices. The method also includes executing the instruction set on the network device to configure the network device. Executing the instruction set includes obtaining link layer discovery protocol (LLDP) information for the network device, determining a most common interface (MCI) connected to the network device using the LLDP information, determining a network device identity using the MCI, obtaining, from the dictionary, a network device specific configuration script for the network device based on the network device identity, and executing the network device specific configuration script to configure the network device.

18 Claims, 6 Drawing Sheets

Network Infrastructure 200

(51) Int. Cl.
*H04L 12/24* (2006.01)
*H04L 12/931* (2013.01)

(52) U.S. Cl.
CPC ............ *H04L 49/356* (2013.01); *H04L 49/65* (2013.01); *Y02B 60/43* (2013.01)

(58) Field of Classification Search
USPC ........................................................ 709/220
See application file for complete search history.

(56) References Cited

U.S. PATENT DOCUMENTS

| | | | | |
|---|---|---|---|---|
| 2011/0292947 | A1* | 12/2011 | Vobbilisetty | H04L 49/70 370/397 |
| 2014/0219079 | A1* | 8/2014 | Kapadia | H04L 41/0806 370/221 |
| 2014/0258479 | A1* | 9/2014 | Tenginakai | H04L 41/082 709/220 |
| 2014/0341225 | A1* | 11/2014 | Subramanian | H04L 49/356 370/401 |

* cited by examiner

METHOD AND SYSTEM FOR AUTO-PROVISIONING NETWORK DEVICES IN A DATA CENTER USING NETWORK DEVICE LOCATION IN NETWORK TOPOLOGY

BACKGROUND

When a data center is deployed, it is common for it to include a large number of network devices, each of which must be properly configured to allow the data center to function as intended. This may be accomplished by accessing each network device and performing a series of configuration steps that enable the network device to perform its specific intended function in the data center. This process typically includes a number of manual steps which are time consuming and error prone and become more so as the size of the data center increases. Additionally, the network devices must also be properly connected (e.g. wired) to both each other, and to other components in the data center that require network connectivity. The process of connecting all the network devices and components in a data center is a manual one and prone to errors. Errors in the network device configuration and connections lead to network devices and other data center components being incorrectly configured, unconnected, or incorrectly connected to the data center's network infrastructure. This leads to the data center not functioning as intended and can be costly to identify and repair.

SUMMARY

In general, in one aspect, the invention relates to a non-transitory computer readable medium that includes instructions, which, when executed by a processor, perform a method on a network device. The method includes receiving a master configuration script from a configuration server. The master configuration script includes an instruction set, a network topology for the data center, and a dictionary. The dictionary includes network device specific configuration scripts for network devices. The method also includes executing the instruction set on the network device to configure the network device. Executing the instruction set includes obtaining link layer discovery protocol (LLDP) information for the network device, determining a most common interface (MCI) connected to the network device using the LLDP information, determining a network device identity using the MCI, obtaining, from the dictionary, a network device specific configuration script for the network device based on the network device identity, and executing the network device specific configuration script to configure the network device.

In general, in one aspect, the invention relates to a system that includes a network device connected to other network devices and a configuration server operatively connected to the network device. The configuration server is configured to provide the network device with a master configuration script. The master configuration script includes an instruction set, a network topology for the network devices, and a dictionary. The dictionary includes a network device specific configuration scripts for the plurality of network devices. The network device is configured to receive the master configuration script and execute the instruction set. Execution of the instruction set includes obtaining link layer discovery protocol (LLDP) information, determining a most common interface (MCI) connected to the network device using LLDP information, determining a network device identity using the MCI, and obtaining, from the dictionary, a network device specific configuration script from the dictionary based on the network device identity. The network device is also configured to execute the network device specific configuration script to configure the network device.

Other aspects of the invention will be apparent from the following description and the appended claims.

DETAILED DESCRIPTION

Figure 1:
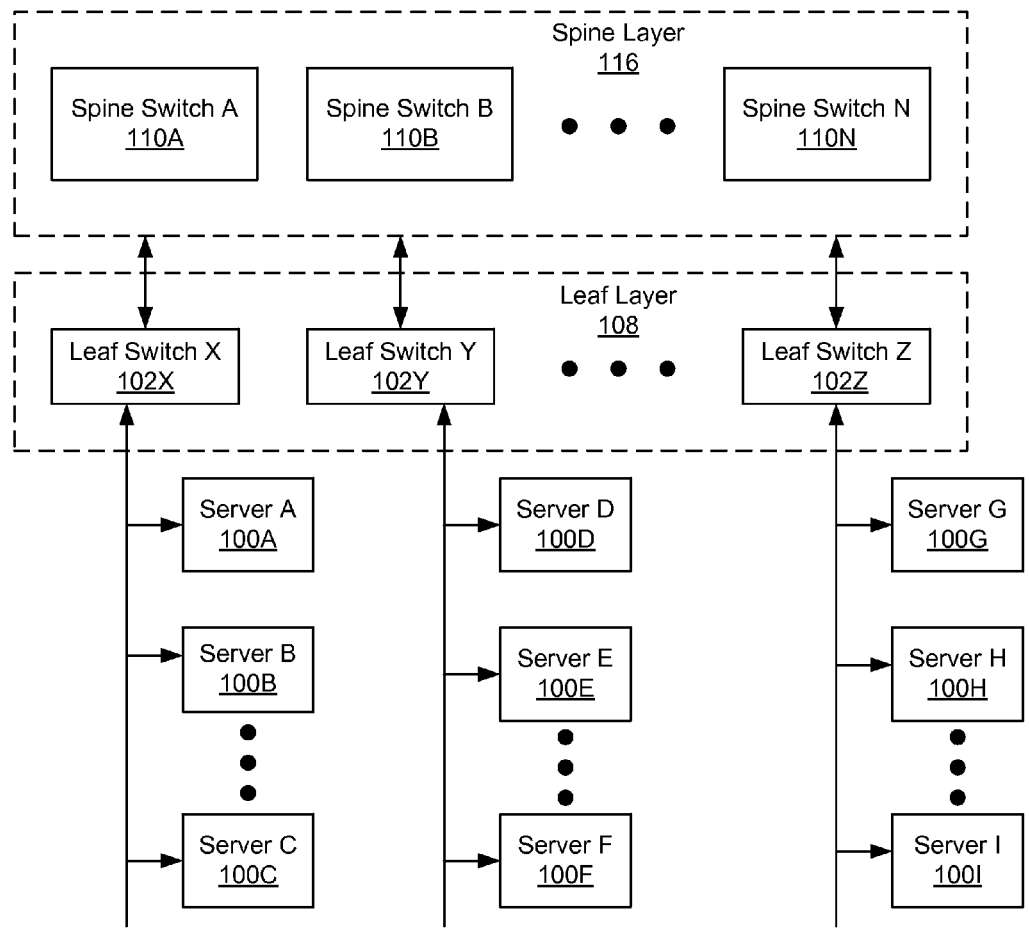
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for automatically configuring network devices (e.g. switches and/or routers) based on their location in a network topology. More specifically, one or more embodiments of the invention enable a user (e.g. a network administrator) to automate (or substantially automate) the configuration of a newly deployed network device or a replacement network device using the location of the network device in the network topology as determined by the most common interface (MCI) of other network devices to which the network device is connected. Additionally, determining the MCI for the network device may identify errors in the connections of the network device to other switches in the network infrastructure.

The following description describes embodiments of the invention in which a data center, including its switches, is being deployed and the switches in the data center are configured using the mechanism described below. However, the invention is not limited to switches; rather embodiments of the invention may be extended to enable configuration for other network devices, such as routers, provided that such network devices are able to obtain MCI information (described below). Also, embodiments of the invention are not limited to network devices that are being initially deployed; rather embodiments of the invention may be extended to network devices that are being used to replace existing network devices, as in the case of a network device failure or a network device hardware upgrade. Also, embodiments of the invention are not limited to network devices in a data center; rather embodiments of the invention may be extended to environments other than a data center in which network devices require configuration.

FIG. 1 shows a system in accordance with one or more embodiments of the invention. In one embodiment of the invention the system is a data center that includes a spine layer (116), a leaf layer (108) and one or more servers (100A-100I). The spine layer may include one or more spine switches (110A-110N) and the leaf layer may include one or more leaf switches (102X-102Z). One skilled in the art will recognize that the number of spine switches, leaf switches, and servers in a data center may vary depending on the requirements that the data center is designed to meet without departing from the invention.

In one embodiment of the invention, the leaf layer (108) includes switches that connect to servers in a data center and the spine layer (116) includes switches that connect to the switches in the leaf layer. A switch is a physical device that includes persistent storage, memory (e.g., Random Access Memory), one or more processors, and two or more physical ports. Each port may or may not be connected to another device on a network (e.g., a server, a switch, a router, etc.). Each spine switch (110A-110N) and leaf switch (102X-102Z) is configured to receive packets via the ports and determine whether to (i) drop the packet, (ii) process the packet in accordance with one or more embodiments of the invention, or (iii) send the packet out another port on the network device. How the switch makes the determination of whether to drop the packet or send the packet to another device on the network depends, in part, on whether the switch is a layer-2 (L2) switch or a layer-3 (L3) switch (also referred to as a multilayer switch). If the switch is operating as a L2 switch, the switch uses the destination media access control (MAC) address along with a forwarding table to determine out of which port to send the packet. If the switch is operating as a L3 switch, the switch uses the destination internet protocol (IP) address along with a routing table to determine out of which port to send the packet. If the switch is a multilayer switch, the multilayer switch includes functionality to process packets using both MAC addresses and IP addresses.

In addition to the functionality described above, the switches may include functionality to operate as a dynamic host configuration protocol (DHCP) client in order to obtain one or more DHCP addresses (as described below in FIG. 4A). The switches may also include functionality to issue hypertext transport protocol (HTTP) requests (e.g. a GET request) and receive HTTP responses. Further, the switches may include functionality to execute other protocols such as link layer discovery protocol (LLDP) and to execute configuration scripts.

Figure 4A:
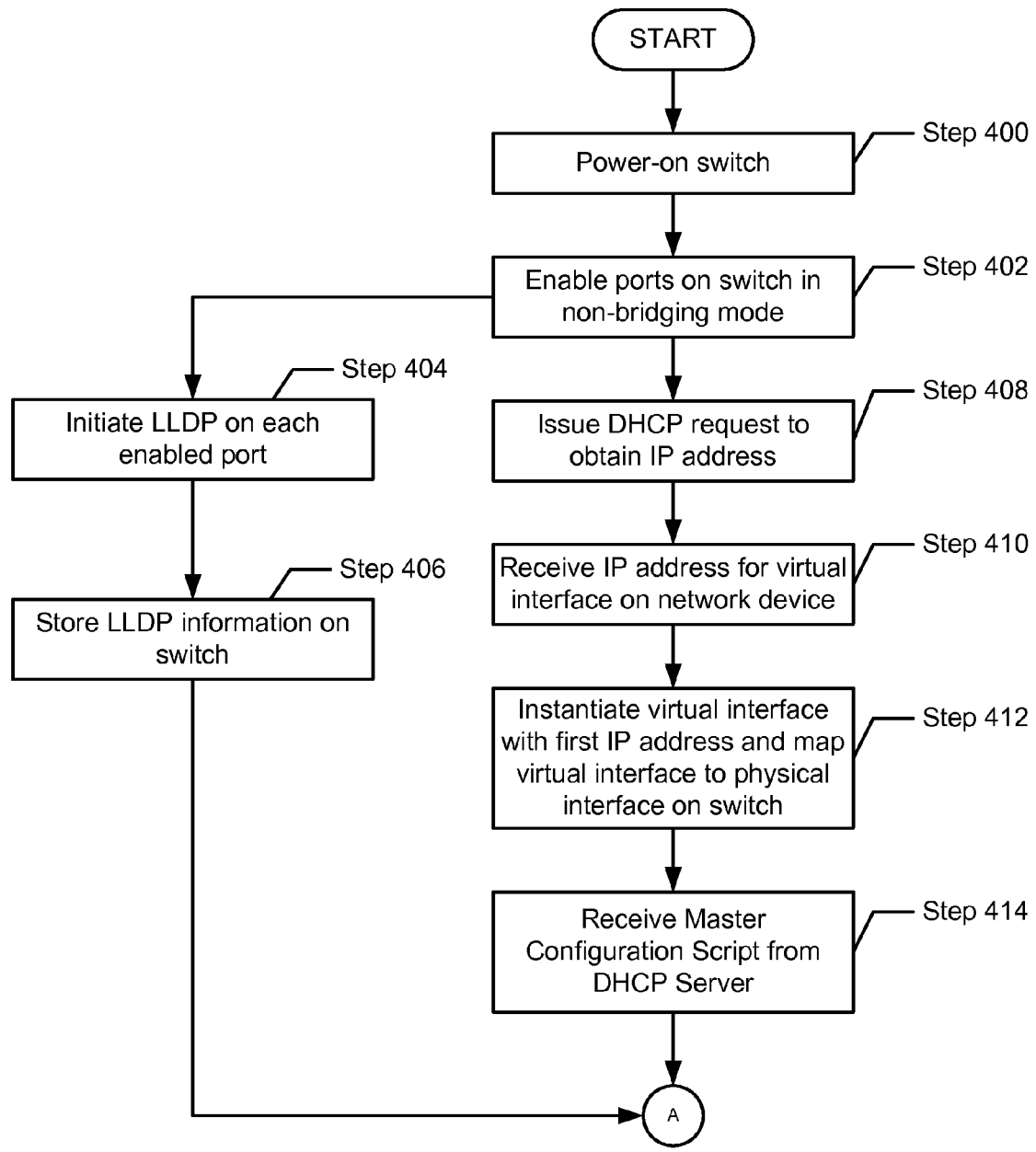
FIGS. 4A-4B show flowcharts in accordance with one or more embodiments of the invention.
Figure 4B:
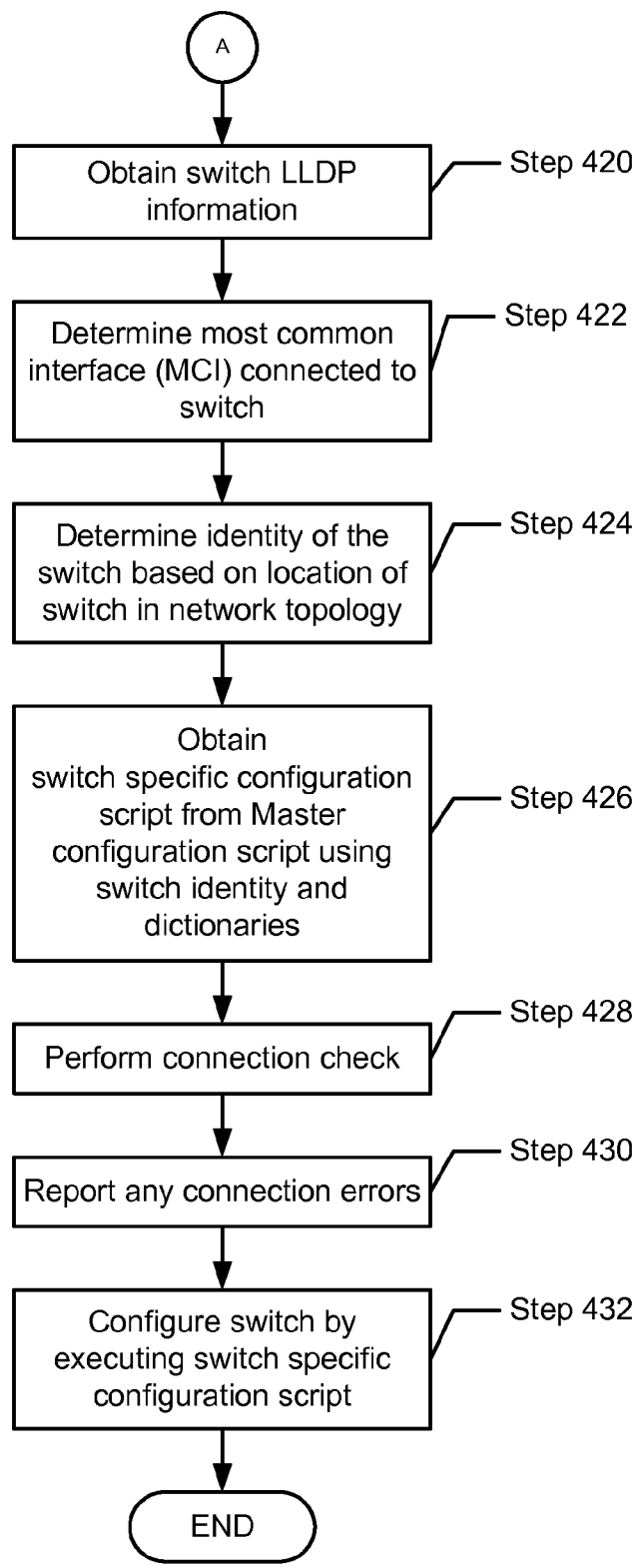

In one embodiment of the invention, the persistent storage in the switch may include any non-transitory computer readable medium that includes instructions, which, when executed by one or more processors in the switch, enable the switch to perform the functions described in accordance with one or more embodiments of the invention (see e.g., FIGS. 4A and 4B).

In one embodiment of the invention, a server (100A-100I) is a computer system. A computer system may include any type of system (e.g. software and computer hardware) that is configured to generate, send, receive, and/or process requests and replies either locally or over a network using software and computer hardware. The server may include a processor, memory, and one or more physical network interfaces. Examples of types of servers include, but are not limited to, DHCP servers, database servers, application servers, file servers, print servers, and mail servers.

Each server (100A-100I) is directly connected to at least one leaf switch (102X-102Z) in the leaf layer (108). In one embodiment of the invention, each server is directly connected to a single switch in the leaf layer (108). In one embodiment of the invention, the leaf switches (102X-102Z) in leaf layer (108) are not directly connected to each other. In one embodiment of the invention, each leaf switch is connected to one or more switches in the spine layer. In one embodiment of the invention, the pattern of connections between the switches in the spine layer and leaf layer is consistent, such that each switch in one layer will be connected the same interface (e.g. port) on the switches in the other layer. This connection consistency ensures that each switch has a most common interface (MCI) that can be identified by examining the switch's interface connections. The MCI is described in more detail in FIGS. 2, 3, and 4A-4B, as well as the example in FIG. 5 below.

Figure 2:
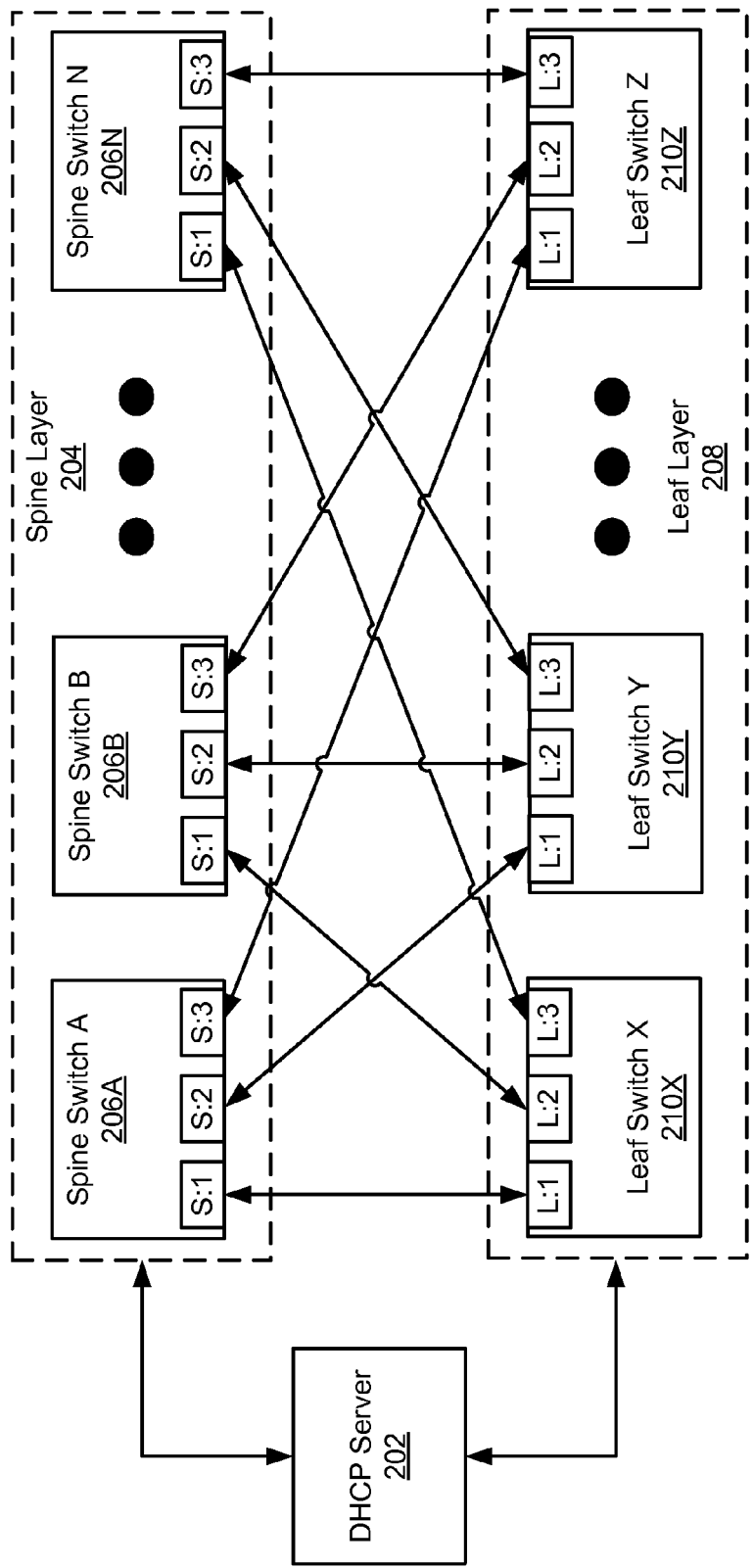
FIG. 2 shows a network infrastructure in accordance with one or more embodiments of the invention.
Figure 5:
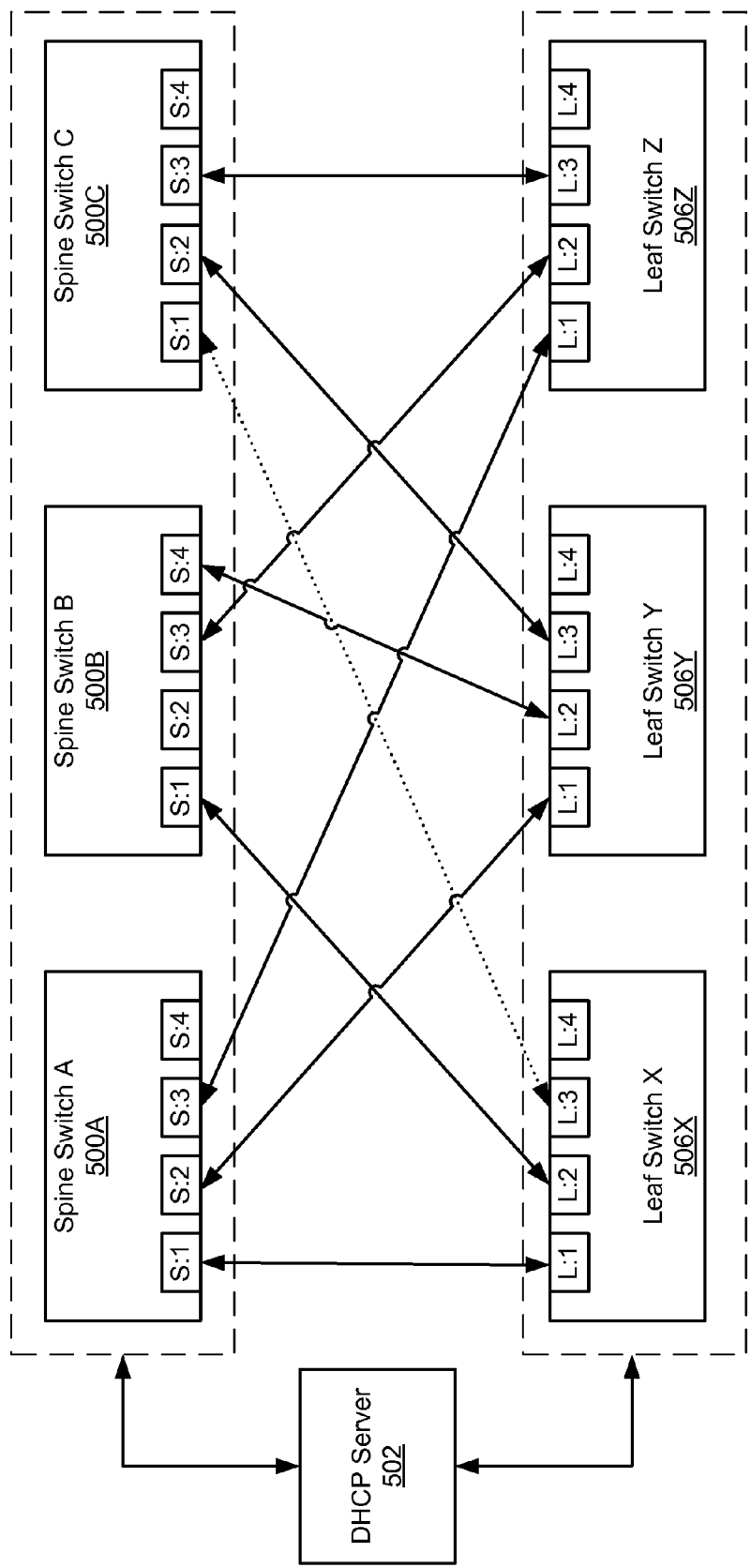
FIG. 5 shows an example in accordance with one embodiment of the invention

Although the number of switches in the spine layer (116) and the leaf layer (108) appear equal in FIG. 1, as well as FIGS. 2 and 5, one skilled in the art will recognize that they may differ in number without departing from the invention. For example, in one embodiment of the invention there are more leaf switches than spine switches in the network infrastructure of a data center.

The invention is not limited to the system configuration shown in FIG. 1.

FIG. 2 shows a network infrastructure in accordance with one or more embodiments of the invention. In one embodiment of the invention, the network infrastructure (200) includes a spine layer (204), a leaf layer (208), and a DHCP server (202). The spine layer may include one or more spine switches (206A-206N) and the leaf layer may include one or more leaf switches (210X-210Z).

In one embodiment of the invention, the DHCP server (202) is an application that is configured to receive DHCP requests from DHCP clients (such as the spine switches (206A-206N) and leaf switches (210X-210Z)) and provide in response the requested IP address(es). The DHCP server may be executing on a server or in a virtual machine (or other virtualized environment) executing on a server. In one embodiment of the invention, the DHCP server is executing on a server (100A-100I) in FIG. 1 above. In one embodiment of the invention, the DHCP server or the server on which the DHCP server is executing is directly connected to one of the switches and is accessible to other switches via this switch.

In one embodiment of the invention, the DHCP server also includes functionality to send a master configuration script (described in FIG. 3) to the spine switches (206A-206N) and the leaf switches (210X-210Z) when they are connected to the network to which the DHCP server. FIG. 2 (as well as FIGS. 3-5) assumes the master configuration script is being sent to the switches from the DHCP server as additional functionality of that server. However, one skilled in the art will recognize that the functionality to send the master configuration script to the switches may be included on a server other than the DHCP server, such as a configuration server (not shown), without departing from the invention. In one embodiment of the invention, the configuration server exists to provide configuration functionality to components in the data center and its network infrastructure and is operatively connected to the spine layer (204) switches and the leaf layer (208) switches via a network connection.

In one embodiment of the invention, the spine switches (206A-206N) and the leaf switches (210X-210Z) are the same as those described above in the description of FIG. 1 (110A-110N and 102X-102Z) and include similar functionality. In one embodiment of the invention, each switch has ports that are numbered using the same numbering scheme such that the identifying information for a given port is the same, in part, for each switch. A port number is a series of numbers, letters, or other characters by which a given port on a switch is identified. A port number may be used to differentiate a port from other ports on the same switch and/or from ports on other switches. A port number may be used whole or in part by software (e.g. scripts, management software, etc.) in order to perform differentiation of ports as required. In one embodiment of the invention, the port numbering for spine switches may be different that the port numbering for leaf switches, allowing for differentiation between ports on switches in the spine layer (204) and the leaf layer (208). For example, in FIG. 1, the first port of all spine switches (206A-206N) has the same port number, S:1, and the third port on all leaf switches (210X-210Z) has the same port number, L:3. In this example, the "S" denotes a port on a switch in the spine layer, and the "L" denotes a port on a switch in the leaf layer. The number (e.g., 1, 2, 3, etc.) identifies the port amongst the ports on a given switch. The consistency in port numbering, when combined with a consistent pattern of connecting the ports of switches in the spine layer (204) and the leaf layer (208), allow a switch's location in the network topology to be determined using the MCI for the switch.

For example, as shown in FIG. 2, each switch port for spine switches in the spine layer (204) includes the same port number. In this example, each spine switch has three ports and every switch in the spine layer has ports numbered S:1, S:2, and S:3. Similarly, each leaf switch port for leaf switches in the leaf layer (208) has three ports numbered L:1, L:2, and L:3. In one embodiment of the invention, each port L:1-L:3 on leaf switch X (210X) is connected to port S:1 on the spine switches (206A-206N). Similarly, leaf switch Y (201Y) is connected to port S:2 on each spine switch and leaf switch Z (210Z) is connected to port S:3 on each spine switch. From the perspective of the spine switches, spine switch A (206A) is connected to port L:1 on each leaf switch (210X-210Z), and spine switches B (206B) and N (206N) are connected to ports L:2 and L:3, respectively, on each leaf switch.

The pattern of connections between leaf and spine switches in this example means that each switch in the network infrastructure (200) has three connections, each to a port with the same port number. This port number is the MCI for a given switch and can be used to determine the switches location in the network topology, which is a map of the network infrastructure (200). Thus, the MCI for spine switch A (206A) is L:1, the MCI for leaf switch X (210X) is S:1, the MCI for spine switch N (206N) is L:3, etc. In this example, a switch may be identified as a spine switch if its MCI is a port on a leaf switch (e.g. a port with "L" in its port number), and the number of the leaf switch port (e.g. 1, 2, or 3) determines which spine switch it is out of the one or more spine switches in the spine layer (204). Similarly, a switch may be identified as a leaf switch if its MCI is a port on a spine switch (e.g. a port with "S" in its port number), and the number of the spine switch port (e.g. 1, 2, or 3) determines which leaf switch it is out of the one or more leaf switches in the leaf layer (208).

One skilled in the art will appreciate that the switch connection pattern in the preceding example leading to the MCI may be different in other embodiments without departing from the invention as long as each switch in the network infrastructure has a port number on other switches that it is attached to that occurs more often than any other port number such that it can be identified as the MCI for the switch.

The invention is not limited to the system configuration shown in FIG. 2.

Figure 3:
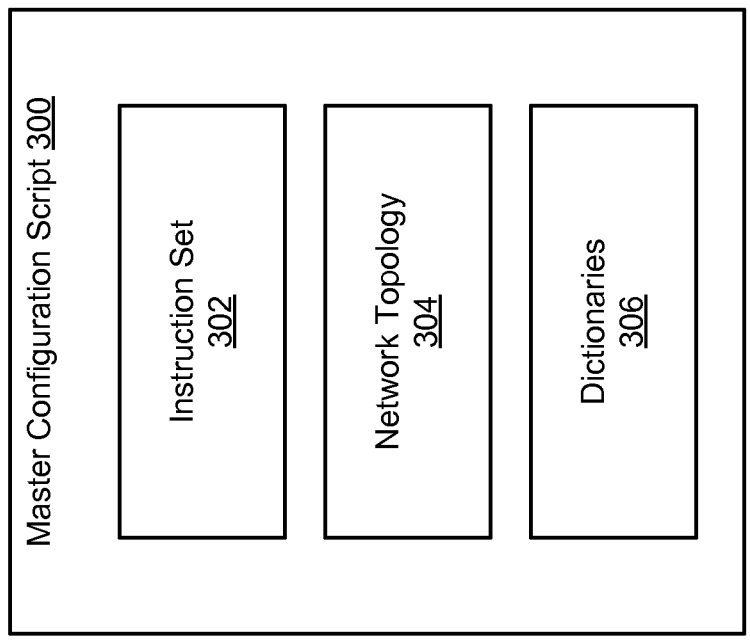
FIG. 3 shows a master configuration script in accordance with one or more embodiments of the invention.

FIG. 3 shows a master configuration script in accordance with one or more embodiments of the invention. In one embodiment of the invention, the master configuration script (300) includes an instruction set (302), a network topology (304) and one or more dictionaries (306).

In one embodiment of the invention, the master configuration script (300) is a program written to execute in the environment of one or more switches in a data center that automates the execution of various tasks. More specifically, the master configuration script is sent to each switch in a data center, where the instruction set (302) is executed to: (i) determine the switch identity via the switches location in the network topology (304), (ii) configure the switch, and (iii) identify any errors in the switch's physical connections.

In one embodiment of the invention, the instruction set (302) is a program that is designed to execute on the switch and includes functionality to identify the MCI (described above in FIG. 2 description), obtain the switch's identity, and obtain the switch specific configuration script. Additionally, the instruction set (302) may include functionality to store the switch specific configuration script in a location on the switch that allows it to be executed upon reboot of the switch, as well as to cause the reboot of the switch. In one embodiment of the invention, the instruction set (302) uses the collections python module, along with link layer discovery protocol (LLDP) information, to determine the MCI seen by a given switch, and then uses that MCI to determine the switch identity from one or more dictionaries that associates the MCI with a switch identity. Python is an object-oriented, extensible programming language, and its collections module includes functionality to count hashable objects (e.g., port numbers in the LLDP information). An object is hashable if it has a hash value (e.g., value resulting from performing a calculation or algorithm on the object) which never changes, and this hashability makes the object usable as a dictionary key. A dictionary is structured data that stores information as keys that correspond to values. The dictionaries that are used to associate the switch identity with the MCI may include a network topology (304). In one embodiment of the invention, part of the network topology is included in a dictionary for the spine layer and part of the network topology is included in a dictionary for the leaf layer.

In one embodiment of the invention, the instruction set (302) also includes functionality to identify errors in switch connections using the MCI. The MCI is determined by discovering the quantity of connections from ports on a switch to ports on other switches. The ports on other switches are numbered, as described above, in such a way that the switch should be connected to a port of the same port number on each other switch enough times that one port number exists more often than others. This one port number is the MCI. In one embodiment of the invention, the instruction set (302) includes functionality to determine the number (or quantity) of connections to the port number that is the MCI for a given switch that it is being executed on and determine if it is correct. The instruction set makes this determination by comparing the quantity of MCI connections for that switch with the expected quantity for a switch at its location in the network topology (304). For example, a switch may be expected, per the network topology (304), to have twelve connections to its MCI. If the instruction set (302) only found the MCI in the LLDP information for that switch eleven times, the instruction set generates an error that logs or reports that a problem has been identified with the switch connections. In this example, the error may be that the quantity of MCI connections was incorrect, indicating that the switch has too few or too many connections to the MCI of other switches, and the instruction set may include functionality to report that information. Additionally, the error may be that the switch has connections to ports on other switches that are unexpected when compared to the network topology (304) and the instruction set may include functionality to report the unexpected error.

In one embodiment of the invention, once the switch has been identified by its location in the network topology (304), the instruction set (302) includes functionality to obtain (or assemble) a switch specific configuration script from one or more dictionaries (306). For example, the master configuration script (300) may include dictionaries (306) where the switch identity is used as the key to obtain values including, but not limited to, name, location, interface IP address information, border gateway protocol (BGP) information, and VLAN information, that are used to configure the specific switch.

The invention is not limited to the system configuration shown in FIG. 3.

FIGS. 4A-4B show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4A-4B may be performed in parallel with any other steps shown in FIGS. 4A-4B without departing from the invention.

Turning to FIG. 4A-4B, in Step 400, the switch is powered on. In Step 402, the ports on the switch are enabled (serially or in parallel) in non-bridging mode. In one embodiment of the invention, while the ports are in non-bridging mode, one or more ports on the switch may be used to perform one or more steps in FIG. 4A. However, if a port receives a packet that is not related to an operation in one or more steps in FIG. 4A, the packet is dropped (or optionally buffered until the switch transitions to bridge mode. After Step 402, Step 404 and Step 408 begin in parallel.

In Step 404, link layer discovery protocol (LLDP) is initiated on each port enabled in Step 402. LLDP is a protocol used by network devices (e.g. switches) for advertising their identity, capabilities, and neighbors. In Step 406, the LLDP information is stored on the switch. In Step 408, the switch generates and issues a DHCP request (using a DHCP client on the switch). The DHCP request is ultimately received and serviced by a DHCP server (e.g. 202 in FIG. 2).

In Step 410, the switch receives a response from the DHCP server that includes an IP address to use on a virtual interface on the switch. In Step 412, a virtual interface is instantiated on the switch with the IP address obtained from the DHCP server. The virtual interface is subsequently mapped to a port on the switch. To programs (e.g. scripts, applications, etc.) executing on the switch, the virtual interface appears as a network interface card (or an equivalent physical component). In Step 414, the switch receives a master configuration script from the DHCP server or configuration server. Then the process moves on the FIG. 4B.

Continuing with the discussion of FIG. 4B, once the master configuration script has been received by the switch using the IP address obtained in Step 410, the instruction set (302 from FIG. 3) begins execution. In Step 420, the instruction set obtains the LLDP information stored on the switch (e.g. stored in Step 406 above).

In Step 422, this information is used to determine the MCI for the switch. In Step 424, the MCI information is used to determine the switch's identity by determining its location in the network topology.

In Step 426, the instruction set obtains (or assembles) a switch specific configuration script using the switch identity as the key to obtain values in one or more dictionaries corresponding to the key.

In Step 428, the instruction set performs a connection check by comparing the number or quantity of MCI connections to the switch with the value expected based on the network topology. In Step 430, if the quantity of MCI connections does not match the expected value, then an error is reported (e.g. recorded in a system log or displayed in a console). In the event the MCI connections only differ in quantity from the expected value, the error reported will indicate that the wiring is correct except for the difference in quantity from the expected. Alternatively, if the ports on the switch expected to be connected to the MCI are connected to a different port number, the error reported will indicate that the switch has connections that are incorrect.

In Step 432, the switch specific script is executed to configure the switch. Execution may include storing the switch specific script in a location on the switch that will cause the script to be executed upon reboot of the switch. Execution may also include rebooting the switch.

FIG. 5 shows an example in accordance with one or more embodiments of the invention. The example is not intended to limit the scope of the invention.

Referring to FIG. 5, consider the scenario in which there is a data center with a network infrastructure that includes six switches and one server. Three of the switches are spine switches (500A, 500B, and 500C). Three of the switches are leaf switches (506X, 506Y, and 506Z). The server is a DHCP server (502). Though not shown in FIG. 5. each of the switches may be connected to other network devices (not shown) and/or other servers (not shown). The network topology shows that the switches should be connected as follows: (i) spine switch A should have ports S:1, S:2, and S:3 connected to port L:1 on each leaf switch; (ii) spine switch B should have ports S:1, S:2, and S:3 connected to port L:2 on each leaf switch; (iii) spine switch C should have ports S:1, S:2, and S:3 connected to port L:3 on each leaf switch; (iv) leaf switch X should have ports L:1, L:2, and L:3 connected to port S:1 on each spine switch; (v) leaf switch Y should have ports L:1, L:2, and L:3 connected to port S:2 on each spine switch; (vi) leaf switch Z should have ports L:1, L:2, and L:3 connected to port S:3 on each spine switch. However, leaf switch X (506X) is missing the connection from port L:3 to port S:1 on spine switch C (500C) (represented in FIG. 5 by a dotted line), and leaf switch Y has port L:2 connected to port S:4 on spine switch B instead of port S:2.

In FIG. 5, assume that all switches are new switches for a data center that need to be configured and that they are all operatively connected to the DHCP server (502). When the switches are powered on, each one will request an IP address from the DHCP server and initiate LLDP on all enabled ports. LLDP information is gathered and stored on each switch. The DHCP server provides each switch with an IP address, which the switch associates to a virtual interface and then associates the virtual interface with a physical interface (e.g. port) on the switch. The DHCP server then sends each switch the master configuration script.

The master configuration script begins executing its instruction set on each switch by obtaining the stored LLDP information. This information allows the instruction set to determine the MCI for each switch. One of the switches has port L:1 as its MCI. The instruction set uses the "L" to determine that it needs to access the dictionary with network topology information for spine switches and uses the MCI port number L:1 as the key to look into the dictionary and obtain the switch identity as spine switch A. The same process occurs on spine switch B and spine switch C. Similarly, one of the switches has port S:1 as its MCI. The instruction set uses the "S" to determine that it needs to access the dictionary with network topology information for leaf switches and uses the MCI port number S:1 as the key to look into the dictionary and obtain the switch identity as leaf switch X. The same process occurs on spine switch B and spine switch C.

After obtaining the switch identity, this information is used by the instruction set as the key for other dictionaries in the master configuration script to assemble a switch specific configuration script from the values obtained from the dictionaries. The switch specific configuration script is placed in the /mnt/flash directory of the switch's file system, which causes the switch specific configuration script to mount and execute the next time the switch reboots.

The instruction set then uses the MCI for each switch identified to perform a connection check. In this example, spine switch C has as an MCI port number L:3, which the instruction set would find twice via connections to port L:3 on leaf switch Y and leaf switch Z. However, the network topology shows that the MCI should be connected to spine switch C three times. Since the two MCI connections detected are not equal to the three MCI connections expected, the instruction set would report an error that the MCI connections seen are not as expected. Similarly, leaf switch X has as an MCI port number S:1, which the instruction set would find twice via connections to port S:1 on spine switch A and spine switch B. However, the network topology shows that the MCI should be connected to leaf switch X three times. Since the two MCI connections detected are not equal to the three MCI connections expected, the instruction set would report an error that the MCI connections seen are not as expected.

Additionally, in this example, spine switch B has an MCI port number L:2, which the instruction set would find twice via connections to leaf switch X and leaf switch Z. However, the network topology shows that the MCI should be connected to spine switch B three times. Since the two MCI connections detected are not equal to the three MCI connections expected, the instruction set would report an error that the MCI connections seen are not as expected. In this error, however, the problem is not only a missing connection, which is demonstrated by leaf switch Y. Leaf switch Y has an MCI port number S:2 via its connections to spine switch A on port L:1 and spine switch C on port L:3. However, the network topology shows that port L:2 should also be connected to a port S:2. In this case, the port L:2 on leaf switch Y is actually connected to port S:4 on spine switch B. This erroneous connection is reported as an error that one of the ports on leaf switch Y is connected to an incorrect port on another switch.

After checking the connections and reporting any errors, the instruction set of the master configuration script will then reboot the switch. The switch specific configuration script executes when the switch boots and configures the switch.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions which, when executed by a processor, perform a method on a network device, the method comprising:
   receiving a master configuration script from a configuration server, wherein the master configuration script comprises an instruction set, a network topology for a plurality of network devices, and a dictionary comprising a plurality of network device specific configuration scripts for the plurality of network devices; and
   executing the instruction set on the network device to configure the network device, wherein executing the instruction set comprises:
   obtaining link layer discovery protocol (LLDP) information for the network device;
   determining a most common interface (MCI) connected to the network device using the LLDP information, wherein the MCI is a consistent port number associated with one port of each of a plurality of other network devices of the plurality of network devices that the network device is connected to more than any other port number;
   determining a network device identity using the MCI;
   obtaining, from the dictionary, a network device specific configuration script for the network device based on the network device identity; and
   executing the network device specific configuration script to configure the network device.

2. The non-transitory computer readable medium of claim 1, the method further comprising:
   receiving, by the network device, an internet protocol (IP) address from a dynamic host configuration protocol (DHCP) server, wherein the network device is one of the plurality of network devices, and wherein the IP address is used to obtain the master configuration script from the configuration server.

3. The non-transitory computer readable medium of claim 1, the method further comprising:
   performing a network connection check for the network device using the MCI.

4. The non-transitory computer readable medium of claim 3, the method further comprising:
   reporting errors for ports that are connected to an incorrect port on another network device of the plurality of network devices when the network connection check fails.

5. The non-transitory computer readable medium of claim 4, wherein the network connection check fails when an MCI count for the network device is less than an expected MCI count value.

6. The non-transitory computer readable medium of claim 3, the method further comprising:
reporting errors for ports that have no expected connection to any port on another network device of the plurality of network devices when the network connection check fails.

7. The non-transitory computer readable medium of claim 1, wherein the configuration server includes functionality to perform (DHCP) services in order to assign an IP address to the network device.

8. The non-transitory computer readable medium of claim 1, wherein obtaining the network device specific configuration script comprises:
determining a specific location of the network device in the network topology using the MCI,
wherein the location determines the network device identity, and
wherein the network device identity is used as a dictionary key to obtain the network device specific configuration script.

9. The non-transitory computer readable medium of claim 1, wherein assembling the network device specific configuration script comprises:
determining a specific location of the network device in the network topology using the MCI,
wherein the location determines the network device identity, and
wherein the network device identity is used as a dictionary key for a plurality of dictionaries containing portions of the network device specific script to be assembled.

10. The non-transitory computer readable medium of claim 1, the method further comprising:
performing LLDP to obtain the LLDP information for the network device, wherein performing LLDP occurs substantially in parallel with obtaining the master configuration script.

11. A system, comprising:
a network device connected to a plurality of other network devices, wherein a plurality of network devices comprises the network device and the plurality of other network devices;
a configuration server operatively connected to the network device,
wherein the configuration server is configured to provide the network device with a master configuration script,
wherein the master configuration script comprises an instruction set, a network topology for the plurality of network devices, and a dictionary comprising a plurality of network device specific configuration scripts for the plurality of network devices, and
wherein the network device is configured to:
receive the master configuration script,
execute the instruction set; wherein executing the instruction set comprises:
obtaining link layer discovery protocol (LLDP) information;
determining a most common interface (MCI) connected to the network device using LLDP information, wherein the MCI is a consistent port number associated with one port of each of a plurality of other network devices of the plurality of network devices that the network device is connected to more than any other port number;
determining a network device identity using the MCI
obtaining, from the dictionary, a network device specific configuration script from the dictionary based on the network device identity; and
execute the network device specific configuration script to configure the network device.

12. The system of claim 11, wherein the network device is one selected from a group consisting of a switch and a router.

13. The system of claim 11, further comprising:
a dynamic host protocol (DHCP) server wherein the DHCP server is configured to provide the network device an internet protocol (IP) address, wherein the IP address is used to obtain the master configuration script from the configuration server.

14. The system of claim 11, wherein the network device is further configured to, prior to executing the network device specific script, perform a network connection check using the MCI.

15. The system of claim 14, wherein the network device is further configured to report errors for ports that are connected to an incorrect port on another network device of the plurality of other network devices when the network connection check fails.

16. The system of claim 14, wherein the network device is further configured to detect a failure in the network connection check when an MCI count for the network device is less than an expected MCI count value.

17. The system of claim 14, wherein the network device is further configured to report errors for ports that have no expected connection to any port on another network device of the plurality of other network devices when the network connection check fails.

18. The system of claim 11, wherein the configuration server is further configured to perform DHCP services in order to assign an IP address to the network device.

* * * * *